(No Model.)
W. J. WILLITS.
CAR WHEEL.
No. 534,774. Patented Feb. 26, 1895.
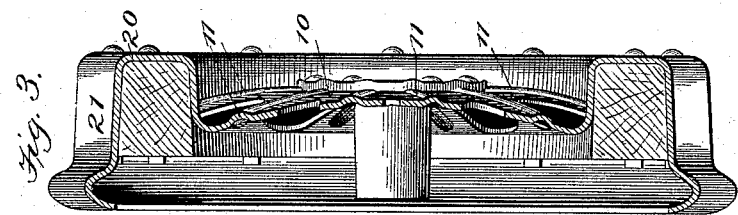
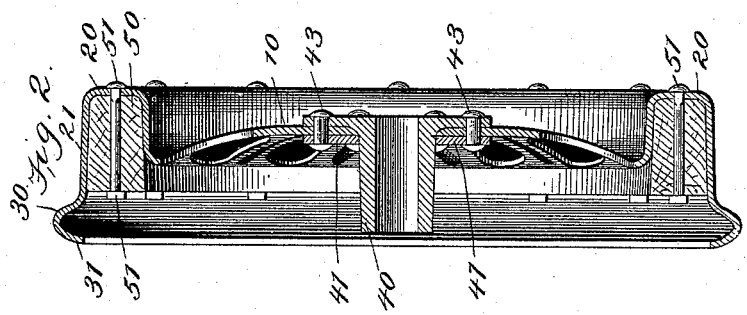
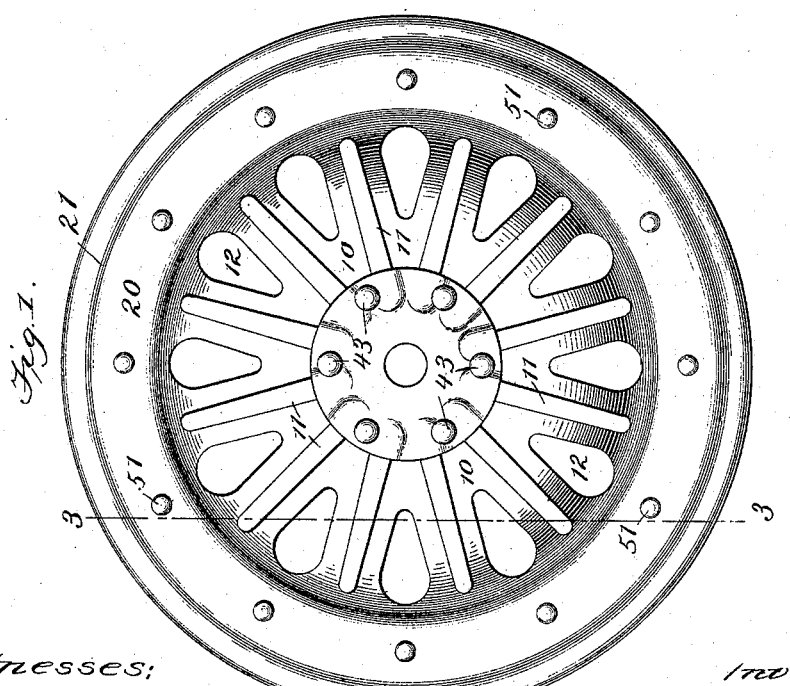
Witnesses:
Edwin L. Bradford
S. M. Dorsett
Inventor:
W. J. Willits
By F. C. Jones,
Attorney

UNITED STATES PATENT OFFICE.

WARREN J. WILLITS, OF THREE RIVERS, MICHIGAN, ASSIGNOR TO THE SHEFFIELD CAR COMPANY, OF MICHIGAN.

CAR-WHEEL.

SPECIFICATION forming part of Letters Patent No. 534,774, dated February 26, 1895.

Application filed May 29, 1894. Serial No. 512,848. (No model.)

*To all whom it may concern:*

Be it known that I, WARREN J. WILLITS, a citizen of the United States, residing at Three Rivers, in the county of St. Joseph, in the State of Michigan, have invented certain new and useful Improvements in Car-Wheels, of which the following is a specification.

This invention relates to wheels principally used for hand cars, push cars, railway velocipedes and similar vehicles. The ordinary cast metal car wheel is not used on this class of vehicles because its weight is prohibitive of such use. In the construction of wheels for this purpose it is of great importance to reduce the weight to the lowest possible limit compatible with strength and durability, since the car is moved by hand power, and the greater the weight the slower the speed; an excessive weight entailing much loss of time among the track hands; but lightness has sometimes been attained at the sacrifice of economy, durability and other requisite qualities. In order to provide for this use a wheel of light weight various composite wheels have been devised in which wrought metal, cast metal, and wood have been united in divers ways. Those wheels were comparatively expensive in the construction, assemblage and fastening together of their parts. Moreover, they lacked durability or required frequent repairs.

To avoid the defects above specified, an "all-steel" wheel, of which that shown in Patent No. 439,358, to Henry F. Mann, dated October 28, 1890, is a type, was put into use. That wheel with the exception of the hub is composed of a single disk of plate iron or plate steel shaped into the desired form by bending and swaging, the web, tread, and rail-flange being integral. Economy of manufacture is obtained in that construction, but the tread is not supported at its point of greatest strain, and in use the wheel produces considerable noise, thus placing the occupants of the hand car in great danger by drowning the noise of an approaching train, which otherwise serves as a warning signal. Then came a wheel in which the web, tread and flange, composed of sheet metal, are integral, and in which the web is opposite the center of the tread. In that case, the metal is bent at right angles to the web to form the tread, and then folded flat upon itself and extended past the web on the other side thereof, forming a tread which is of double thickness on one side of the web and of single thickness on the other; or in another form of that wheel the metal is again folded upon itself, making a tread of double thickness on both sides of the web. In neither form is there any bracing or support for the tread except at the central right-angled connection thereof with the web, and when the weight comes upon the tread near either edge thereof, the web is liable to buckle and the tread to bend relatively to the web. Moreover, that wheel produces the same signal drowning noise.

In my Patent No. 491,456, dated February 7, 1893, I sought to reduce the resonant vibrations and secure a central support for the tread, but in doing so I separated the web and tread in two parts, which required to be fastened together. In that construction more metal is necessary and hence the weight is increased. Furthermore, the wheel is comparatively expensive in the construction and assemblage of its parts, and requires more frequent repairs than a wheel having a solid web and tread.

The objects of the present invention are to avoid the defects and objections above specified and to combine the properties of economical simplicity of construction, lightness of weight, strength, durability, and comparative noiselessness in use. To this end I form an annular convexo-concave rib integral with the web at the periphery of the latter. This rib constitutes an annular arch surrounding and greatly strengthening the body of the wheel. In the concave face of this rib I insert a filling which serves to further strengthen the wheel and also to deaden the noise.

Figure 1 of the accompanying drawings represents an elevation of the outer face of this wheel. Fig. 2 represents a diametrical section of this wheel. Fig. 3 represents a section on line 3—3 of Fig. 1.

The same reference numbers indicate the same parts in all the figures.

The web 10 of the wheel is composed of wrought plate or sheet steel wrought plate or sheet iron and has near its circumference an annular convexo-concave rib 20 integral with said web, and the outer periphery 21 of said rib constitutes the thread of said wheel. This annular rib is convex on the outer vertical face of the wheel and concave on the inner vertical face thereof, forming an annular cavity or recess on said inner face. The annular rib comprises two lateral annular flanges concentrically disposed apart from each other and bent in opposite directions and integrally connnected by an annular portion preferably disposed in a radial plane. The tread 21 is provided, as usual, at its inner edge with a rail flange 30 for keeping the wheel on the rail, said flange being preferably integral with said tread, and being preferably provided with a reinforcing back-turned lip 31 integral with the toe of said flange. These parts are constructed from a disk of metal of sufficient diameter to include the web 10, the annular rib 20 including the tread 21, the rail flange 30 and the reinforcing lip 31 on said flange; and said disk is bent into the shape shown by means of flanging machines, dies, or other suitable appliances, as will be readily understood by those skilled in the art.

The tread 21 is, when desired, provided with a separate tire 22 of any suitable form fastened in any known manner.

The web 10 is preferably provided in the usual manner with radial convexo-concave swaged ribs 11, which serve to strengthen it and prevent buckling thereof, and the web is also preferably provided in the usual manner between said ribs with openings 12 which reduce the weight of the wheel. That portion of the web between the rib and hub is preferably dished in the usual manner.

The hub 40 is of any suitable construction and is composed of wrought or cast iron, or steel. As shown, it is provided at its inner end with a flange 41. This hub is passed through the central opening of the web 10 and said web is clamped by means of bolts or rivets 43 between a collar 42 and said flange 41 in the usual manner.

A filling 50 is disposed on the inner face of the wheel in the annular cavity of the convexo-concave rib 20, being secured in said cavity by bolts 51, which pass through said filling and through the outer portion of said rib. This filling may be composed of metal, but it is preferably constructed of wood, vulcanized fiber, paper, rubber, or other suitable material which will serve to absorb the vibrations and reduce the noise of the wheel. It is also preferably constructed in the form of a ring.

The annular convexo-concave rib 20 imparts elasticity and strength to the wheel, while at the same time bringing the main portion of the web 10 to a point opposite that portion of the tread 21 which usually bears upon the rail, and this is accomplished without weakening the metal by folding it upon itself, the bend of the metal being in arched form.

The filling when disposed in the cavity of the rib 20 greatly strengthens the wheel against both lateral and vertical strains, and, even when constructed of metal, reduces the vibrations and noise of the wheel; and when constructed of wood or other material of a similar character, the noise is reduced to a minimum. This reduction of noise is especially important, as otherwise the noise of the hand car overcomes the warning given by the sound of an approaching train.

I claim as my invention—

1. A car wheel having a wrought metal web provided with an integral annular convexo-concave rib, the outer periphery of which constitutes the tread, and a filling disposed in the cavity of said rib.

2. A car wheel having a wrought metal web provided with an integral annular convexo-concave rib, the outer periphery of which constitutes the tread, and a ring disposed in the cavity of said rib.

3. A car wheel having a wrought metal web provided with an integral convexo-concave annular rib, and a filling of noise-absorbing material disposed in the cavity of said rib.

4. A car wheel whereof the tread, rail-flange and web are composed of a single piece of wrought sheet metal, said web having an annular convexo-concave rib, the outer periphery of which constitutes the tread, and said rib having a filling.

5. A car wheel whereof the web is composed of wrought metal and provided with an integral annular convexo-concave rib, the outer periphery of which constitutes the tread of the wheel, said rib comprising two lateral annular flanges concentrically disposed apart from each other and bent in opposite directions and integrally connected.

WARREN J. WILLITS.

Witnesses:
M. J. HUSS,
E. H. HENDERSON.